(12) United States Patent
Cain et al.

(10) Patent No.: US 9,100,544 B2
(45) Date of Patent: Aug. 4, 2015

(54) PROVIDING SPONTANEOUS CONNECTION AND INTERACTION BETWEEN LOCAL AND REMOTE INTERACTION DEVICES

(75) Inventors: Gamil A. Cain, El Dorado, CA (US); Cynthia E. Kaschub, San Francisco, CA (US); Rajiv K. Mongia, Redwood City, CA (US); Anna-Marie Mansour, Hillsboro, OR (US); Matthew D. Coakley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 13/992,626

(22) PCT Filed: Jun. 11, 2012

(86) PCT No.: PCT/US2012/041889
§ 371 (c)(1),
(2), (4) Date: Jun. 7, 2013

(87) PCT Pub. No.: WO2013/187869
PCT Pub. Date: Dec. 19, 2013

(65) Prior Publication Data
US 2013/0329000 A1    Dec. 12, 2013

(51) Int. Cl.
*H04N 7/15*  (2006.01)
(52) U.S. Cl.
CPC . *H04N 7/152* (2013.01); *H04N 7/15* (2013.01)
(58) Field of Classification Search
USPC ....................................................... 348/14.08
See application file for complete search history.

(56) References Cited

U.S. PATENT DOCUMENTS

| 6,108,028 A | 8/2000 | Skarbo et al. |
| 6,677,980 B1 | 1/2004 | Jeon |
| 6,806,898 B1 | 10/2004 | Toyama et al. |
| 2006/0023915 A1 | 2/2006 | Aalbu et al. |
| 2010/0098056 A1* | 4/2010 | Falken et al. ................. 370/352 |
| 2010/0159430 A1* | 6/2010 | Lee et al. .................. 434/307 R |
| 2010/0315482 A1 | 12/2010 | Rosenfeld et al. |
| 2012/0017149 A1* | 1/2012 | Lai et al. ....................... 715/716 |

OTHER PUBLICATIONS

Iachello, G. et al., "Control, deception, and Communication: Evaluating the deployment of location-enhanced messaging service", UbiComp, LNCS 3660, 2005, pp. 213-231.

(Continued)

*Primary Examiner* — Joseph J Nguyen
(74) *Attorney, Agent, or Firm* — Schwabe, Williamson & Wyatt, P.C.

(57) ABSTRACT

Embodiments of methods, systems, and storage medium associated with establishing a persistent connection between local and remote interaction devices are disclosed herein. In one instance, the method may include operating the local interaction device in a first power state when a motion of a local user within an area proximate to the local device is not detected, and operating the local interaction device in a second power state when a motion of the local user within the area is detected. The method may further include providing a selected view of a plurality of views of the local area responsive to a gaze direction of the remote user, and providing audio communication from the local interaction device to the remote interaction device with a spatial characteristic that approximates co-location of the local and remote users. Other embodiments may be described and/or claimed.

22 Claims, 5 Drawing Sheets

(56) References Cited

OTHER PUBLICATIONS

Iachello, G. et al, Developing privacy guidelines for social location disclosure applications and services. Symposium on Usable Privacy and Security (SOUPS) 2005, Jul. 6-8, 2005, 12 pages, Pittsburgh, PA.
Judge, J.K. et al., The Family Window: The design and evaluation of a domestic media space. CHI Conference Proceedings, Apr. 10-15, 2010, pp. 2361-2370, Atlanta, Georgia.
Judge, J.K. et al., Family Portals: Connecting families through a multifamily media space. CHI Conference Proceedings, May 7-12, 2011, pp. 1205-1214, Vancouver, BC, Canada.
Minneman, S. L. & Harrison, S.R., "Where Were We: Making and using near-synchronous, per-narrative video." Xerox Palo Alto Research Center, 9 pages, Palo Alto, CA.
Nakinishi, H. et al., "FreeWalk: A 3D virtual Space for casual meetings." IEEE MultiMedia, pp. 20-28.
Neustaedter, C. et al., "Blur Filtration Fails to Preserve Privacy for Home-Based Video Conferencing" ACM Transactions on Computer Human Interactions (TOCHI), 2006, pp. 1-36.
Regenbrecht, H., "Carpeno: Interfacing remote collaborative virtual environments with table-top interaction. Virtual Reality-Systems, Development and Applications, Special Issue on"Collaborative Virtual Environments for Creative People., 2006, 27 pages.
Yorosh, S., "ShareTable", https://sites.google.com/site/sharetable/.
Yorosh, S., et al., "Supporting parent-child communication in divorced families. International Journal of Human-Computer Studies, 67", 2009, pp. 192-203.
Dourish, P., et al., "Portholes: Supporting Awareness in Distributed Work Group", May 3-7, 1992, 7 pages.
International Search Report and Written Opinion mailed Aug. 23, 2013 for International Application No. PCT/US2012/041889, 12 pages.
International Preliminary Report on Patentability mailed Dec. 24, 2015 for International Application No. PCT/US2012/041889, 9 pages.

* cited by examiner

PROVIDING SPONTANEOUS CONNECTION AND INTERACTION BETWEEN LOCAL AND REMOTE INTERACTION DEVICES

CROSS REFERENCE TO RELATED APPLICATIONS

The present application is a national phase entry under 35 U.S.C. §371 of International Application No. PCT/US2012/041889, filed Jun. 11, 2012, entitled "PROVIDING SPONTANEOUS CONNECTION AND INTERACTION BETWEEN LOCAL AND REMOTE INTERACTION DEVICES", which designated, among the various States, the United States of America. The Specification of the PCT/US2012/041889 Application is hereby incorporated by reference.

FIELD

Embodiments of the present disclosure generally relate to the field of perceptual interaction technologies, and more particularly, to techniques for providing spontaneous connections between users placed in different remote locations, and/or facilitating interactions between the users with reduced perception of separation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Current telecommunication technologies allow users in two or more different locations to communicate by simultaneous two-way video and audio transmissions. The examples of such communication technologies include videoconferencing, videophone calls, voice-over-Internet-Protocol-based services (such as Skype®) and other services.

However, existing communication techniques, such as videoconferencing, cause technical and psychological issues, such as perceived lack of direct eye contact, user appearance consciousness, inadequate quality of service (e.g., signal latency), and the like. Furthermore, current solutions require a prescribed set of steps required by the user in order to communicate with a remote user. The intentionality required is not a part of face to face interactions, and thereby creates an experience that does not feel natural. Accordingly, existing communication techniques do not provide users with a perception of being in close proximity to each other. Thus, spontaneity and ease of communications may be lacking in the user communications provided by currently available technologies.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
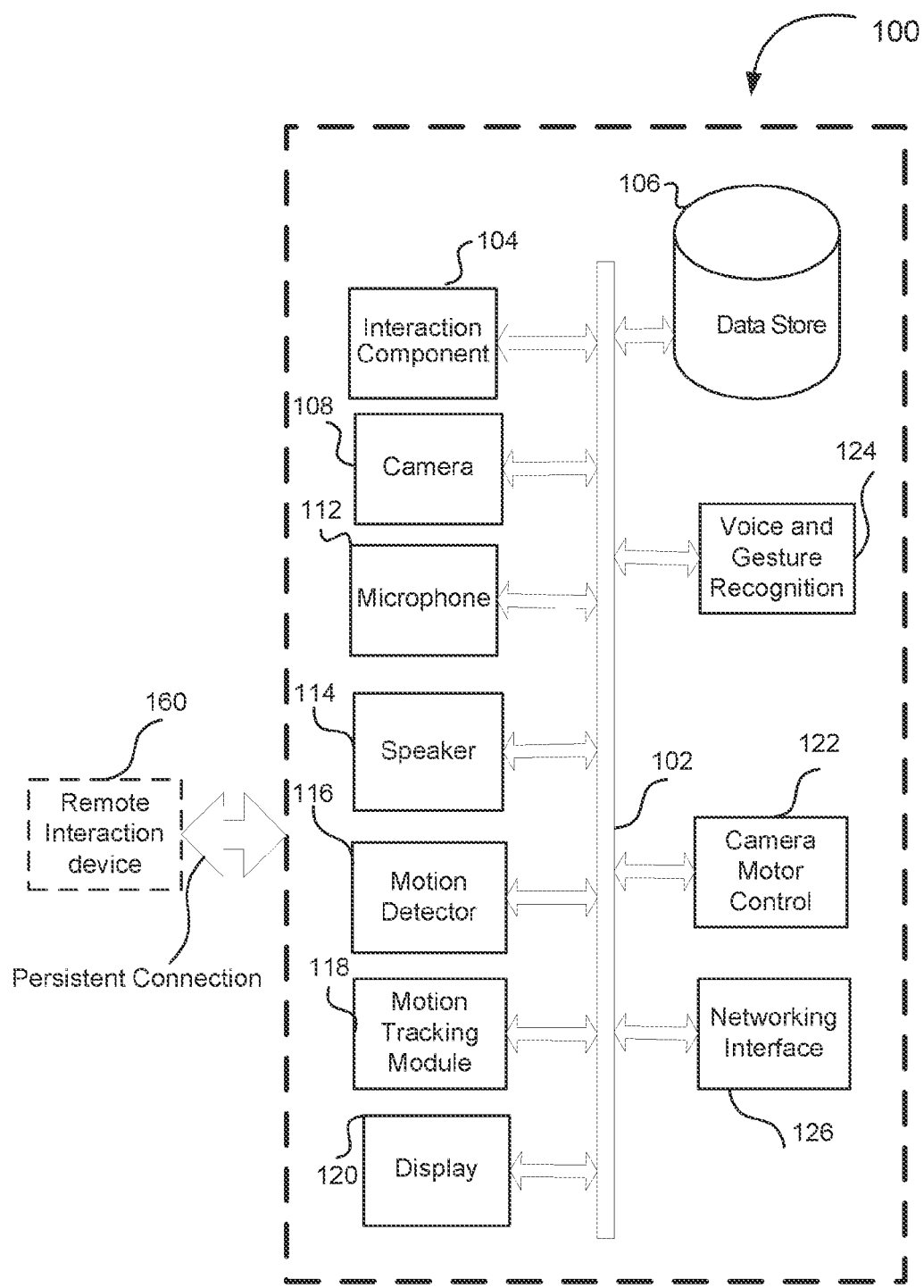
FIG. 1 illustrates an example of an interaction device with a persistent connection to another device to provide spontaneous connection and interaction in accordance with some embodiments.

Techniques described herein provide for establishing a persistent and spatial separation reduction audio and/or visual connection between two or more remote locations so as to give end users the perception of being in close proximity to each other. The persistence of the connection may lend itself to users interacting spontaneously and in an un-scheduled fashion, which is analogous to the types of interactions that occur when people are co-located.

Embodiments described herein may be realized in many forms, including incorporation into typical home fixtures such as window fixtures or mirrors. An interaction device configured to provide a persistent connection with a remote location may melt seamlessly into the user's environment to promote impromptu natural conversation with another user being at the remote location. For example, an interaction device may be incorporated in a mirror hanging on a wall at the user's location, such as user's home. The mirror surface may incorporate a device's display component. In another example, the interaction device may be incorporated in a picture or a window.

The device's components, such as motion sensors, cameras, interaction components, microphones, and the like that may be employed to enable a persistent connection of the interaction device with other users' interaction devices included in the interaction system described herein may be incorporated in a fixture associated with the display component, such as a bezel around a device's display component of the interaction device (e.g., a mirror or picture frame), or incorporated into other parts of the environment (e.g. using existing sound system to provide audio output from the remote connection). Accordingly, the device's nonintrusive characteristics may enable a user to become comfortable and behave naturally with other connected users even during moments where no active conversation is taking place, further deepening the sense of co-location with the other users.

User communications with the interaction device may include commands issued by the user, such verbal commands, touch commands, or gesture commands. The device may detect a user's intent to issue a command based on a particular position of the user relative to the device. For example, a position of the user's head relative to the interaction device and/or the user's gaze (e.g., user's face pointed directly at the interaction device display) may be a detectable indication of the user's intent to issue a command. Once a command is issued, the device may identify the command and respond accordingly. For example, the command may include a request to connect with another user. In response, the device may provide a persistent connection with another user as described herein.

Maintaining the persistent connection of the interaction device with other users' interaction devices included in the interaction system may be based on detecting user motion in a local area serviced by an interaction device, but may not necessarily require the user motion to be directed towards the device (for example, a user issuing a command). Any user motion may keep the persistent connection (e.g. the device may detect motions of kids playing in the room in which device is located). In general, users do not have to be intentional to use the interaction system. The system may be present and active in a smart manner to facilitate spontaneous interaction between local and remote users.

When the user is not in the area where the interaction device is located or when the user is in the area but not moving, the device may remain in "sleep" mode, e.g., in a low power state. Once the interaction device detects a motion associated with the user, the interaction device may switch to a regular mode, e.g., a regular power state.

Generally, embodiments of the interaction device may be implemented in such a way that users may be largely abstracted from issuing commands via voice and gestures so as to minimize such interactions, enabling users to experience other users they wish to connect with.

Aspects of the interaction device functionality (e.g. parallax described herein in greater detail) and responsiveness (e.g., an ability to pick up ambient noise in the remote location, etc.) may provide an experience in which users may feel that they are just a room apart, as opposed to being geographically dispersed.

FIG. 1 is a block diagram of an example interactive device 100 suitable for facilitating spontaneous connection and interaction in accordance with some embodiments. The interaction device 100 is not limited to the device components described herein; other suitable configurations of the device using different components may be used without departing from the spirit of the present disclosure. For ease of understanding, interaction device 100 will be described as the local interaction device. Further, remote interaction device 160 may be considered similarly constituted as interaction device 100.

In an embodiment, the device 100 may include a number of components coupled, for example, via a bus 102. The device 100 may include one or more interaction components 104, each having a processor and a memory. In alternate embodiments, the interaction components 104 may share memory. The interaction components 104 may be associated with a data store 106 configured to store various types of data, e.g., data associated with a user profile, data associated with other users of the system, data related to a detection of user commands, and the like. The data store 106 may store computer-executable instructions that may cause the device 100, when executed on the interaction components 104, to perform one or more of the operations described below in reference to the device's components. In another embodiment, the computer-executable instructions may be stored on data store 106 or another, e.g., remote data store and executed, for example, on a server supporting the interaction device described herein.

The device 100 may include one or more cameras 108. The cameras 108 may include one or more 2D and 3D cameras configured to work in concert to provide depth and high resolution views into the local environment for a remote user of remote interaction device 160.

The device 100 may further include one or more microphones 112 (e.g. in one embodiment, an array of microphones). The use of array microphones may enable capturing of spatially relevant audio as well as the use of beam forming techniques to ensure the user "actively" speaking may be heard on the remote side of the connection with a perception of reduced spatial separation.

The device 100 may further include one or more speakers 114. The speakers 114 may include high fidelity speakers configured to enable replication of the audio spatial relationships of remote audio in the local environment.

The device 100 may further include one or more motion detectors 116 having one or more motion sensors. The motion detectors 116 may be configured to detect motion in the local area, such as help identify presence of a user in the local area. The motion detectors may allow the device 100 to remain in a low power state while there is no user activity detected by the motion detectors 116.

The device 100 may further include a motion tracking module 118. The motion tracking module 118, working in concert with (e.g., operating) the cameras 118, may be configured to enable a user on the local side of the connection to follow the interactions of the person on the other side of the connection. Furthermore, this module may be configured to perform user face tracking and/or gaze tracking, that is, the ability to detect the perspective that the user is looking into display 120. As described above, using face or gaze tracking may enable the device 100 to detect user intent to issue a command. One skilled in the art will appreciate that there may be alternate approaches in terms of components used to track a presence or motion of a person, for example, by using off the shelf motion detection/tracking systems, using simple (e.g., low power) motion detector, camera and audio, or other permutations of the components listed above.

Using gaze tracking in concert with a camera motor control 122 may also enable the device 100 to support parallax. As known, parallax is an apparent change in the direction of an object, caused by a change in observational position that provides a new line of sight. As applied to the device 100 providing a persistent connection to a similar interaction device 160 installed at a remote location, as the local user turns his head to the left, right, up, or down, a camera system associated with the interaction device 160 may accordingly adjust its perspective on the remote user of the interaction device 160. This functionality may allow the user to gain a more complete view of the remote environment.

The device 100 may further include a voice and gesture recognition module 124 configured to facilitate natural interactions with the device 100, such as through voice and gesture commands as briefly described above. For example, the voice and gesture recognition module may enable the user to perform administrative tasks, such as connecting to a specific person, e.g., a user of the remote device 160, in an intuitive manner.

The device 100 may further include a networking interface module 126 configured to facilitate communications between the device 100, remote interaction device 160, and one or more server devices (not shown) that may be configured to support an interaction system comprising two or more interaction devices 100, 160. Communications between the devices 100, 160 may occur via a network, such as Internet or any other type of network (not shown). A more detailed description of an example interaction system including two or more interaction devices 100, 160 is provided below in reference to FIG. 5.

Figure 2:
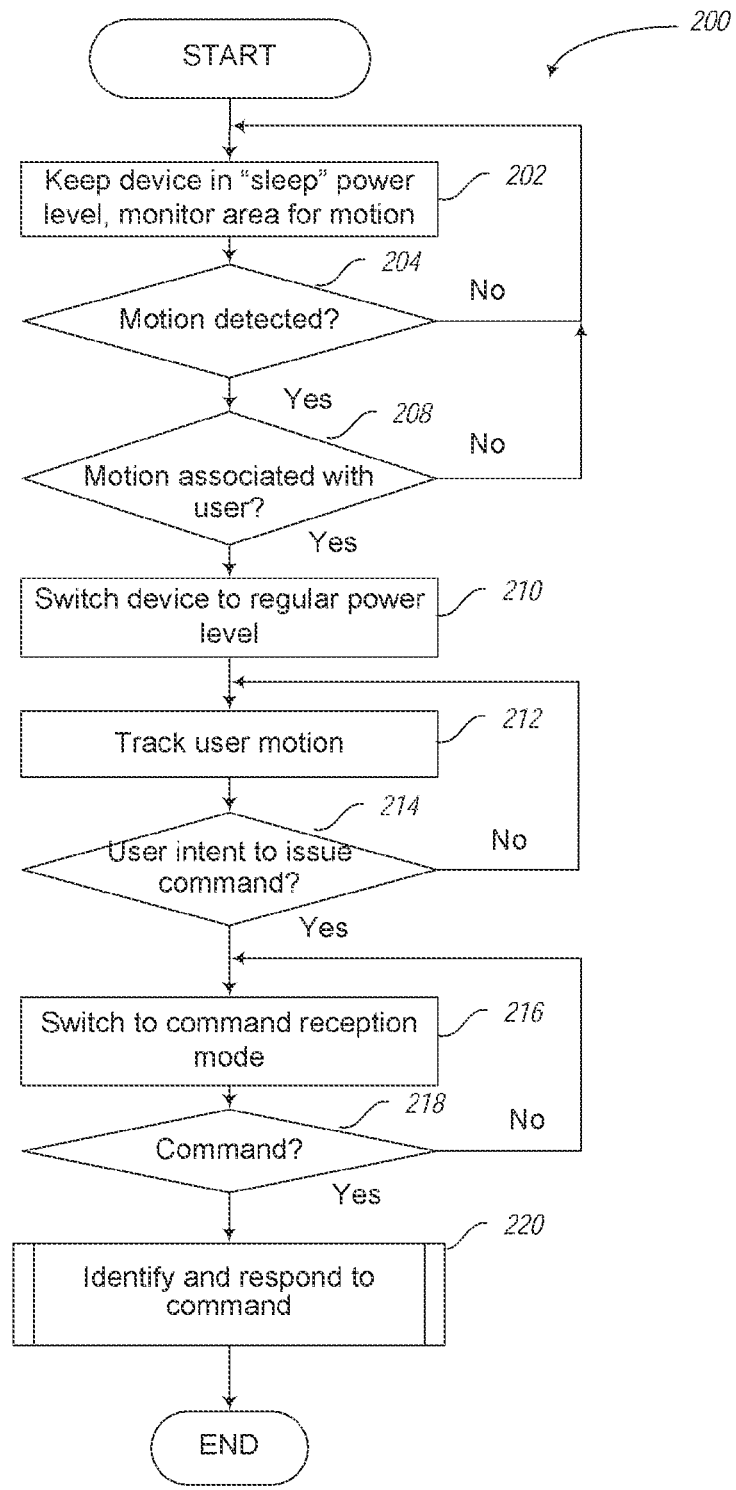
FIG. 2 illustrates a process flow diagram for identifying a presence of a user by a local interaction device in accordance with an embodiment.

FIG. 2 illustrates a process flow diagram for operation of an interaction device 100 described in reference to FIG. 1 in accordance with an embodiment. The process 200 may begin at block 202, where the device may be kept in a low or "sleep"

power state. In the low power state, the device may be configured to monitor an area in which the device is located for any motion. At decision block 204, it may be determined whether any motion in the area is detected, e.g., with the motion detector 116. If no motion is detected, the process may return to block 202. If motion is detected, at decision block 208 it may be determined whether the motion is associated with a user. This determination may be done in a number of different ways. For example, the interaction device, using the motion tracking module 118, may determine whether the motion belongs to a human body. This may be done by tracking a skeleton of a human body using known tracking techniques. In another example, the interaction device may determine, using microphones 112, whether there is a human voice in the area proximate to the device.

If it is determined that the motion is not associated with a user, the process 200 may move back to block 202. If it is determined that the motion is associated with a user, at block 210 the device may switch to a regular power state, which is typically higher than the low or "sleep" power state. At block 212, the device may track any user motion that occurs in the area proximate to the device, e.g., using the motion tracking module 118.

At decision block 214, it may be determined whether the user intends to issue any command to device. This determination may be based on a number of different indicators that may be detected by the interaction device. For example, the device may detect a position of the user's face relative to the screen of a display of the device. If the user's face is pointed directly at the screen or turned toward the screen, such face position may be an indicator that the user intends to issue a command to the device. In another example, the device may track the user's gaze. If the user looks directly at the screen, this may also serve as an indicator of the user's intent to issue a command to the device. In yet another example, an air gesture may serve as an indicator of the user's intent to issue a command. For example, a user may point at the device from a distance in the local area.

If no user intent is detected, the process may move back to block 212. If the user intent to issue command is detected, at block 216 the device may initiate a command reception mode. The command reception mode may include changing one or more configurations of the device 100. For example, positions of the microphones 112 may be adjusted so as to point toward the user in order to be ready to receive a verbal command. The cameras 108 may be also pointed at the user in order to receive a gesture command. The command reception mode may be operated by the voice and gesture recognition mode 124 configured to receive input from the microphones 112 and/or from the cameras 108 and process the received input in order to recognize the issued command. In another example, the voice and gesture recognition mode may be 124 configured to receive touch commands. For example, the user may interact with a touch-enabled screen of the device to execute a particular command.

At decision block 218 it may be determined whether a command is issued by the user. If no command is issued, the device may remain in the command reception mode as indicated at block 216 (or remain for a predetermined duration). If a command is issued, the process 200 may move to "identify and respond to command" routine at block 220. The routine 220 may include a process of identification of a command and responding to the identified command and is described in reference to FIG. 3. After completion of the routine 220 the process 200 may end.

Figure 3:
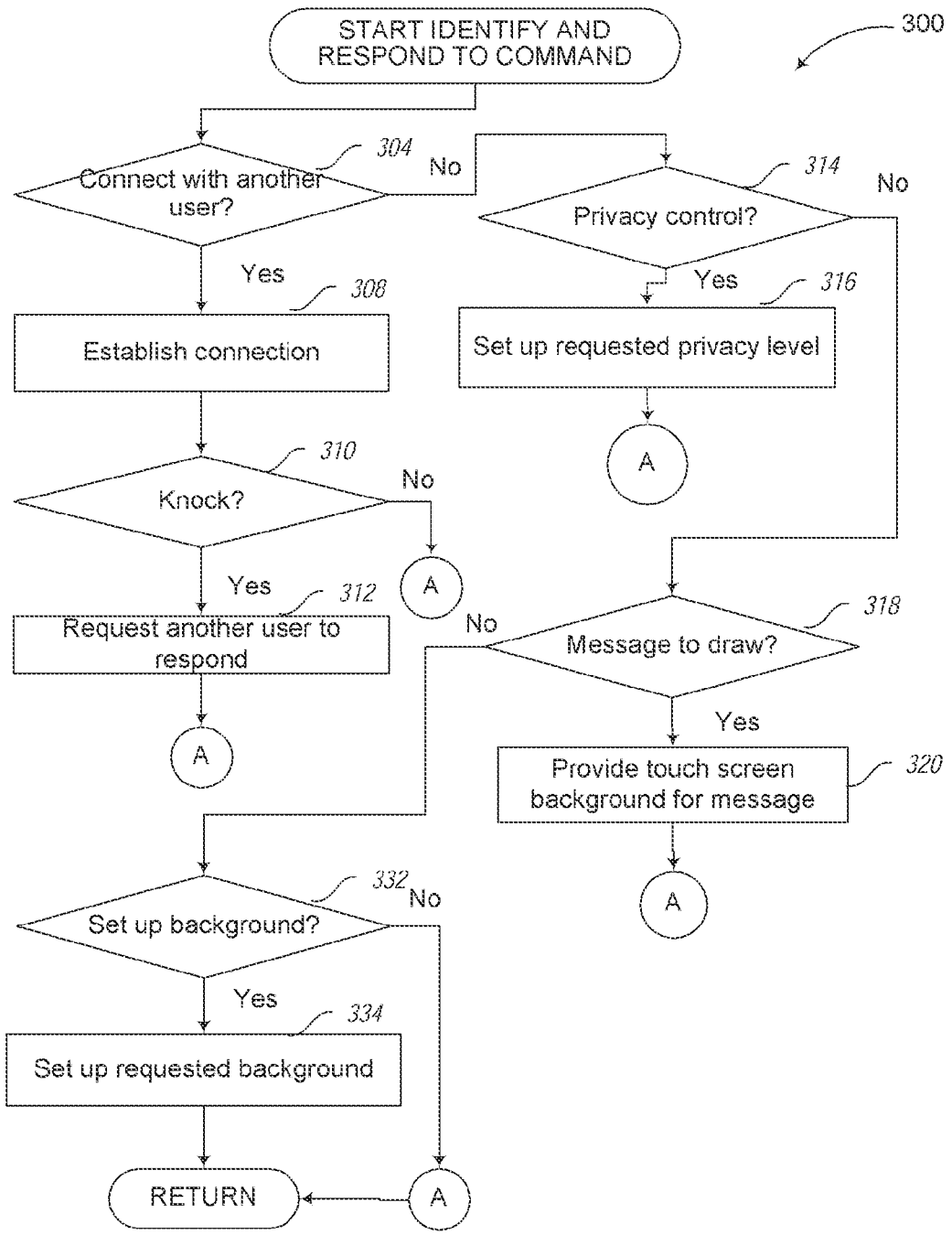
FIG. 3 illustrates another process flow diagram for providing spontaneous connection and interaction between a local interaction device and remote interaction device in accordance with an embodiment.

FIG. 3 is a process flow diagram for an "identify and respond to command" routine, as referenced in the description of FIG. 2. In an embodiment, the device may recognize multiple voice and gesture commands. The command profile information that may be used to identify issued commands (e.g., keywords, types of gestures, and the like) may be preloaded and stored, for example, at the data store 106. Accordingly, the device may identify a command by comparing an issued command with stored profiles and selecting the matching profile. The device then may respond to the identified command accordingly.

The "identify and respond to command" routine illustrated in FIG. 3 is but an example of the above-described process. While the command identification process is described as sequential, other approaches (e.g., identification of commands in parallel) may be employed. Furthermore, the command identification order, a sequence in which the issued command is compared with command profiles may vary. Different orders of command identification may be used. For example, at any point in time the system may already be connected to a remote user. As such, Privacy Control, Knock, Message to Draw, Connect or any other command described below may be performed at any time. Thus, the sequential order of commands illustrated in FIG. 3 should be considered as purely illustrative and not limiting the present disclosure. Further, the commands may not be limited to the commands described by the routine 300. Other commands may be added to the command profiles stored in association with the device 100 as needed.

The routine 300 may begin at block 304 where it may be determined that the received command is to connect with another user. The "connect" command may be issued, e.g., as a voice command, for example, "Connect with John." The users' profiles used for connection may be preloaded and utilized by the device. For example, the device may determine the intent to connect from a keyword, such as "connect." The intent to connect with a particular user, e.g., John Doe, may be determined from the name "John" said by the user. If John's profile is accessible by the device as one of the multiple stored user profiles, the device may select John's profile from the stored user profiles and initiate a connection with a remote interaction device associated with John's profile. In another example, there may be a special gesture command indicating a request to connect with a particular user. If the command to connect with another user is issued, at block 308, an additional or replacement persistent connection with another user, e.g., with a remote interaction device associated with another user, may be established.

After the additional/replacement persistent connection with another, e.g., remote user is established, at decision block 310 it may be determined whether a "knock" command is issued. A "knock" command may be issued if the remote user is determined to be busy, as may be seen on the screen of the interaction device. In another example, the remote user may employ one of privacy controls described below. In this case, the local user may have a capability to request remote user's attention using the "knock" command. The "knock" command may be analogous to a knock at the closed door of another user's house. For example, the "knock" command may be performed by performing a knocking gesture or tapping the screen of the interaction device. If no "knock" command is issued, the routine 300 may return to the beginning If the "knock" command is issued, the device may send a request to another user to respond to the "knock". For example, on the receiving end, e.g., the remote interaction device associated with another user (e.g., Joe), may issue a sound reminiscent of a knock at the door so that Joe may hear that the user requested his attention. The process 300 may then return to the beginning.

If at block 304 it is determined that the command is not related to connecting with another user, the routine 300 may move to decision block 314, where it may be determined whether the command is related to setting up a privacy control mode. If such command is determined to have been issued, at block 316 a requested privacy level may be set up. The routine 300 may then return to the beginning.

There may be different type of privacy control modes. The privacy control modes may be thought of as different states of a window in a room. In an "open window" privacy control mode, another user may see and hear the user, e.g., both audio and video feeds may be transmitted from the interaction device associated with the user to a remote interaction device associated with another user (e.g., Joe). In a "closed window" privacy control mode, only video feed may be transmitted to the remote interaction device and no audio transmission occurs. In a "closed window shade" privacy control mode, only audio transmission to the remote interaction device occurs and no video feed is supplied to the remote interaction device.

If the command is not related to privacy control, at decision block 318 it may be determined whether the command is requesting a "message to draw." In one example, a "message to draw" command may be issued after the "knock" command if the remote user (Joe) does not respond to the "knock" command. In another example, another user (Joe) associated with the remote interaction device may simply be absent. In these cases, the user may want to leave a message for Joe.

The "message to draw" command may be thought of as a fogged window on a cold day. To fog the window, one may put one's hands around the mouth and blow on the window. The blown air may create a fog on the window, on which one may draw with one's finger, for example. By way of analogy, the "message to draw" command may be issued, for example by mimicking the "blowing on the window" gesture. Once the "message to draw" command is identified, e.g., by detecting the "blowing on the window" gesture, at block 320, a touch screen background suitable for a message to draw with the user's finger may be provided by the device. For example, a "digital fog" environment receptive to the user's touch may be created on the screen of a display of the interaction device. The user then may draw or write a message on the screen. The device may then process the input message and transmit the processed message to the remote interaction device, where it may appear on the screen of a display of the remote interaction device. The process 300 may then return to the beginning.

If the command is not related to message to draw, at block 332 it may be determined whether the command is related to the background to set up on the screen of the device. If it is determined that the command is not related to a background setup the process 300 may return to the beginning If the command is determined to be related to setting up a background, at block 334 the requested background may be set up on the screen of the device and the process 300 then returns. For example, the background may be a picture, a photograph, a painting, or any other background theme that the user may choose. The background may be requested in a number of different ways. For example the user may request a "picture roll" of pre-stored backgrounds and then select one via voice or gesture (e.g., by pointing at the desired background). In another example, the user may issue a voice background command, e.g., "Show me a Paris picture, please."

In yet another example, the system may accept requests for foreground digital overlays. Thus, if the device is a physical window, and is currently being used as a window instead of a portal, the user may request for "snow please", and the system would create digital snowflakes. In general, the system may have augmented reality capabilities of varying sorts, the above description being but one example of the system capability to provide augmented reality.

Figure 4:
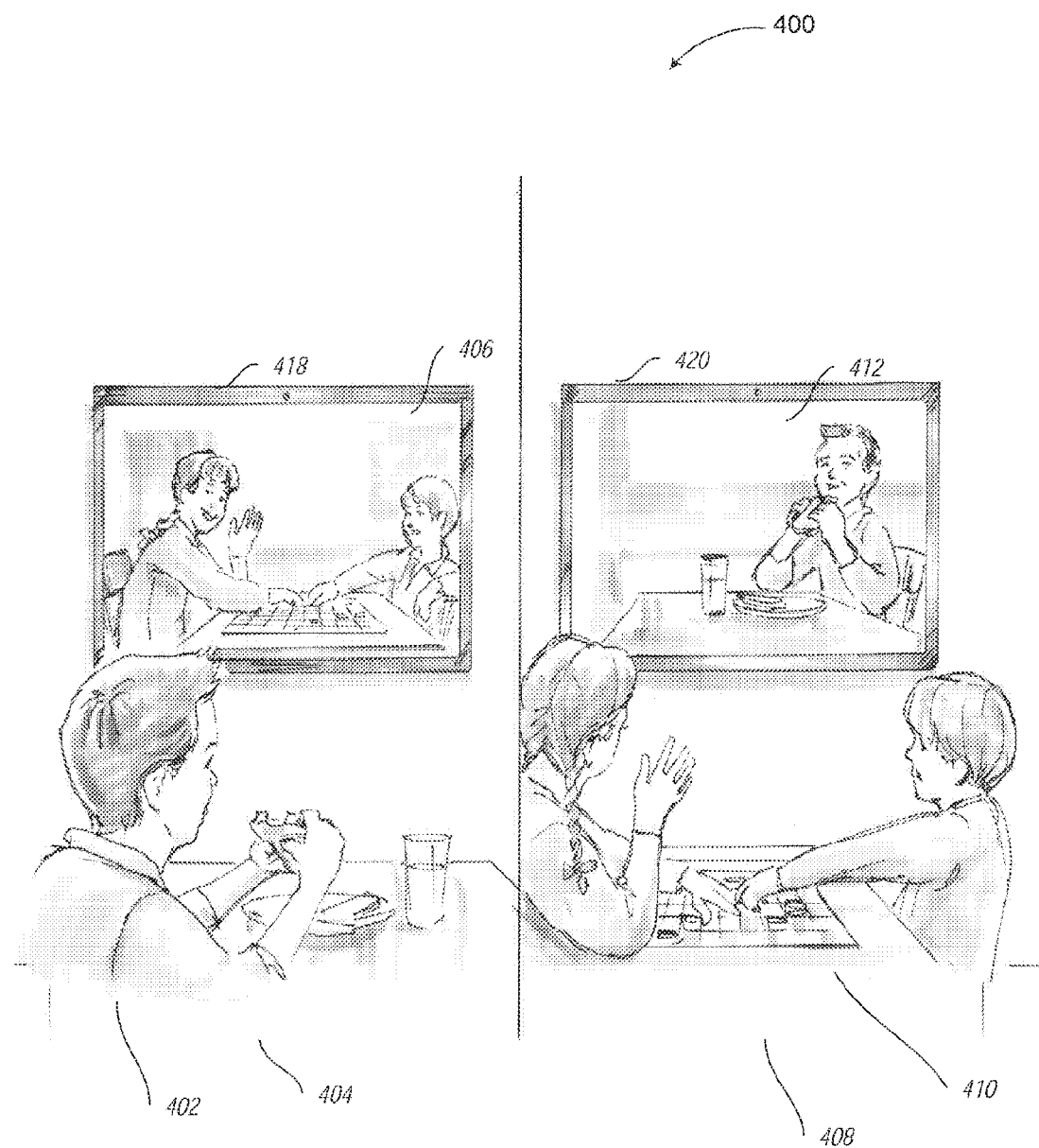
FIG. 4 illustrates an environment in which spontaneous connections and interactions between interaction devices may be practiced in accordance with an embodiment.

FIG. 4 illustrates an example environment 400 in which various embodiments may be practiced in accordance with some embodiments. The environment 400 may include a user 402 in a location 404 interacting, via an interaction device 406, with other users 410 at a remote location 408. The users 410 interact with the user 402 via a remote interaction device 412. As described above, a persistent connection between the devices 406 and 412 may be established. In the example environment 400, neither of the devices 406 and 412 is in a privacy control mode.

The area 404 including the user 402 may be shown on the screen of a display of the device 412 and the area 408 including the users 410 may be shown on the screen of the display of the device 406. The devices 406 and 410 (or their display with or without other components) may be integrated as an ambient component of the areas 404 and 408, such as mirrors as illustrated. Thus, when the devices are not turned on, the devices may serve as mirrors hanging on the walls of the areas 404 and 408. Some or all of the device components described in reference to FIG. 1 may be integrated in the mirror frames 418 and 420.

Figure 5:
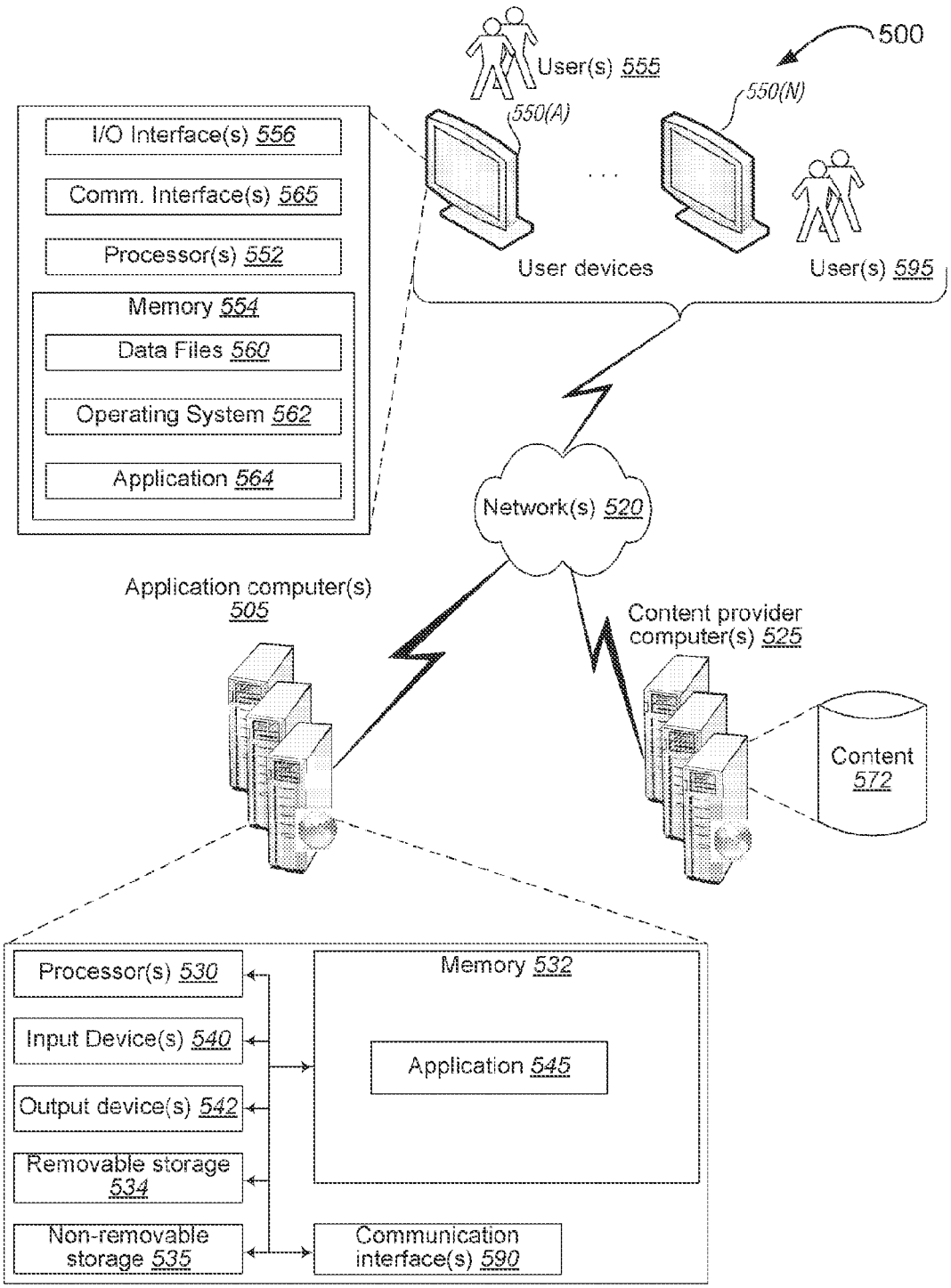
FIG. 5 illustrates an environment in which various embodiments of an interaction system may be implemented.

FIG. 5 illustrates an example environment 500 suitable for implementing aspects of the interaction system described herein in accordance with various embodiments. As will be appreciated, although a Web-based environment is used for purposes of explanation, different environments may be used, as appropriate, to implement various embodiments. The environment 500 includes one or more electronic interaction devices 550(A)-550(N), each of devices associated with one or more users 555, 595. The device 550 may include any interaction device operable to provide a persistent connection with another interaction device over an appropriate network 520 and convey information back to the user 555 of the device. Examples of such interaction devices were described in reference to FIGS. 1-4. The user devices 550(A)-550(N) may include a processor 552 and memory 554 for storing processor-executable instructions, such as data files 560, operating system 562, and one or more applications 564, such as applications configured to enable a persistent connection between the devices 550A and 550N, for example.

The devices may further include at least one or both of the following elements: input/output interface 556 designed to enable peripheral component interaction with the system 500 and communication interface 565. In various embodiments, the input/output interface 556 may include, but is not limited to, a display, e.g., a liquid crystal display, a touch screen display, etc., a speaker, a microphone, a still camera, a video camera, a flashlight (e.g., a light emitting diode flash), and other components described in reference to FIG. 1. For embodiments including a display supporting touch screen features, the system 500 may include a touch screen controller for facilitating control of the display. As discussed above, operating system 562 and/or an application 564 may include software components configured, when executed on the processor 552, to cause the device 550(A) to perform one or more operations enabling a persistent connection with other (remote) interaction devices 550(N) as described in reference to FIGS. 1-4.

The network 520 may include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof. In one example, the illustrative environment 500 may be configured to provide the capabilities described in reference to FIGS. 1-4 using one or more endpoints, such as local devices 550(A) and remote interaction devices 550(N) that may be connected through a network described above. For example, content associated with user interactions may be stored on the devices 550(A) and 550(N) and communicated between the devices 550(A) and 550(N) via a network or direct connection, taking advantage of the computing resources associated with the respective endpoints, such as a local device 550(A) and remote device 550(N).

In another example, the network may include the Internet, and the environment may include one or more Web servers (content provider servers) 525 for receiving requests and serving content in response thereto, although for other networks, an alternative device serving a similar purpose could be used, as would be apparent to one of ordinary skill in the art. The illustrative environment 500 may include at least one application server 505 including, or associated with, one or more processors 530, input devices 540, output devices 542 (e.g., administrative input/output devices), removable storage 534, and non-removable storage 535 that may be connected to a communication interface 590 and memory 532. As discussed above, in one embodiment, one or more applications 545 configured to enable persistent connection between interaction devices 550(A), 550(N) may reside on the server 505 and may execute on the device 550 or server 505, or partly on the device 550 and server 505. Accordingly, the memory 532 may include an application module 545.

The handling of all requests and responses, for example, the requests for content initiated by the user 595 (e.g., request for the background setup described in reference to FIG. 3), as well as the delivery of content between the interaction devices 550(A)-550(N) and the application server 505, may be handled by one or more content provider Web servers 525. The content data store 572 may be associated with the server 525. The data store 572 is operable, through logic associated therewith, to receive instructions from the server 525 and obtain, update, or otherwise process data in response thereto.

Each server may include an operating system that provides executable program instructions for the general administration and operation of that server, and typically may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 500 may include a variety of data stores and other memory and storage media as discussed above. These may reside in a variety of locations, such as on a storage medium local to (and/or resident in) one or more of the computers or remote from any or all of the computers across the network. Any necessary files for performing the functions attributed to the computers, servers, or other network devices may be stored locally and/or remotely, as appropriate. The storage media may include disk drives, optical storage devices, and solid-state storage devices, such as random access memory ("RAM") or read-only memory ("ROM"), flash memory or other memory technology, CD-ROM, digital versatile disk (DVD) or other optical storage, magnetic cassettes, magnetic tape, magnetic disk storage or other magnetic storage devices, as well as removable media devices, memory cards, flash cards, or any other medium which may be used to store the desired information and which may be accessed by a processor.

The environment 500 may be a distributed interaction environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature, and not limited to the scope of the disclosure.

According to various embodiments, the present disclosure describes a computer-readable storage medium having executable instructions stored thereon that, in response to execution by a computer of a remote user interaction system, cause the computer to provide a spontaneous connection from a local interaction device to another remote interaction device for a local user of the local interaction device to interact with a remote user of the remote interaction device. The provision includes maintenance of a persistent connection between the local and remote interaction devices, wherein maintenance of the persistent connection includes operation of the local interaction device in a first power state when a motion of the local user within a local area proximate to the local interaction device is not detected, and operation of the local interaction device in a second power state when a motion of the local user within the local area is detected. The instructions further cause the computer to facilitate the interactions between the local and remote users. Facilitation of the interactions includes reduction of perception of separation between the local and remote users, and wherein reduction of perception of separation includes provision of a selected one of a plurality of views of the local area responsive to a gaze direction of the remote user, and provision of audio communication from the local interaction device to the remote interaction device with a spatial characteristic that approximates co-location of the local and remote users.

According to various embodiments, the present disclosure describes an interaction device comprising a processor and a memory having processor-executable instructions stored thereon that, when executed on the processor, cause the processor to provide spontaneously a connection from a local interaction device to another remote interaction device for a local user of the local interaction device to interact with a remote user of the remote interaction device, wherein the provision includes maintenance of a persistent connection between the local and remote interaction devices. Maintenance of the persistent connection includes operation of the local interaction device in a first power state when a motion of the local user within a local area proximate to the local interaction device is not detected, and operation of the local interaction device in a second power state when a motion of the local user within the local area is detected. The instructions further cause the processor to facilitate the interaction between the local and remote users. Facilitation of the interactions includes reduction of perception of separation between the local and remote users, and wherein reduction of perception of separation includes provision of a selected one of a plurality of views of the local area responsive to a gaze direction of the remote user, and provision of audio communication from the local interaction device to the remote interaction device with a spatial characteristic that approximates co-location of the local and remote users.

According to various embodiments, the present disclosure describes a computer-implemented method for establishing a persistent connection between local and remote interaction devices, comprising providing spontaneously a connection from a local interaction device to another remote interaction device for a local user of the local interaction device to interact with a remote user of the remote interaction device, the providing including maintaining a persistent connection between the local and remote interaction devices. The maintaining the persistent connection includes operating the local interaction device in a first power state when a motion of the local user within a local area proximate to the local interaction device is not detected, and operating the local interaction device in a second power state when a motion of the local user within the local area is detected. The method further includes facilitating the interactions between the local and remote users. Facilitating includes reducing perception of separation between the local and remote users, wherein the reducing perception of separation includes providing a selected one of a plurality of views of the local area responsive to a gaze direction of the remote user, and providing audio communication from the local interaction device to the remote interaction device with a spatial characteristic that approximates co-location of the local and remote users.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. At least one non-transitory computer-readable storage medium having executable instructions stored thereon that, in response to execution by a computer of a remote user interaction system, cause the computer to:
   provide a spontaneous connection from a local interaction device to another remote interaction device for a local user of the local interaction device to interact with a remote user of the remote interaction device, wherein to provide the spontaneous connection includes to maintain a persistent connection between the local and remote interaction devices, wherein to maintain the persistent connection includes to operate the local interaction device in a first power state when a motion of the local user within a local area proximate to the local interaction device is not detected, and operate the local interaction device in a second power state when a motion of the local user within the local area is detected, which includes: to detect a motion in an area associated with the local user; determine whether the motion is associated with the local user; if the motion is determined to be associated with the local user, switch the local interaction device from the first power state to the second power state; track the local user motion in the user area, including to determine a local user intent to issue a command; and if an indication of the local user intent to issue a command is determined, initiate a command reception mode to receive a local user command; and
   facilitate the interactions between the local and remote users, which includes to reduce perception of separation between the local and remote users, and further includes to provide a selected one of a plurality of views of the local area responsive to a gaze direction of the remote user, and provide audio communication from the local interaction device to the remote interaction device with a spatial characteristic that approximates co-location of the local and remote users.

2. The non-transitory computer-readable storage medium of claim 1, wherein the computer is part of the local interaction device.

3. The non-transitory computer-readable storage medium of claim 1, wherein the operation of the local interaction device in the first power state consumes less power than the operation of the local interaction device in the second power state.

4. The non-transitory computer-readable storage medium of claim 1, wherein the local user command is selected from at least one of a voice command, touch command, or a gesture command, wherein the indication of the local user intent to issue a command is determined from at least one of a first gesture of the local user or a first position of the local user, wherein the determination of the first position of the local user includes a detection of a position of a face of the local user relative to a screen of the local interaction device.

5. The non-transitory computer-readable storage medium of claim 4, wherein the executable instructions further cause the interaction device, with the local interaction device, to:
   receive the local user command;
   identify the received local user command; and
   respond to the identified local user command,
     wherein the identified local user command includes a request to connect with the remote user.

6. The non-transitory computer-readable storage medium of claim 5, wherein the instructions that cause the interaction device to respond to the identified local user command further cause the interaction device to establish a persistent connection from the local interaction device to the remote interaction device, the connection including a provision of video and audio communications from the local interaction device to the remote interaction device.

7. The non-transitory computer-readable storage medium method of claim 6, wherein the identified local user command includes a request to initiate a privacy control mode for the local interaction device, wherein the privacy control mode includes at least one of a closed window mode or a closed shade mode, wherein the closed window mode includes video communications from the local interaction device to the remote interaction device, wherein the closed shade mode includes audio communication from the local interaction device to the remote interaction device.

8. The non-transitory computer-readable storage medium method of claim 1, wherein the identified local user command includes one of: a request to draw attention of the remote user, a request to draw a message for the remote user, a request to set up a background on a screen of the local interaction device, or a request to provide an augmented reality foreground on the screen of the local interaction device.

9. An interaction device comprising:
   a processor; and
   a memory having processor-executable instructions stored thereon that, when executed on the processor, cause the processor to:
   provide spontaneously a connection from a local interaction device to another remote interaction device for a local user of the local interaction device to interact with a remote user of the remote interaction device, wherein to provide the connection includes to maintain a persistent connection between the local and remote interaction devices wherein to maintain the persistent connection includes to operate the local interaction device in a first power state when a motion of the local user within a local area proximate to the local interaction device is not detected, and operate the local interaction device in a second power state when a motion of the local user within the local area is detected, which includes: to detect a motion in an area associated with the local user; determine whether the motion is associated with the local user; if the motion is determined to be associated with the local user, switch the local interaction device from the first power state to the second power state; track the local user motion in the user area, including to determine a local user intent to issue a command; and if an indication of the local user intent to issue a command is determined, initiate a command reception mode to receive a local user command; and facilitate the interaction between the local and remote users, which includes to reduce perception of separation between the local and remote users, and further includes to provide a selected one of a plurality of views of the local area responsive to a gaze direction of the remote user, and provide audio communication from the local interaction device to the remote interaction device with a spatial characteristic that approximates co-location of the local and remote users.

10. The interaction device of claim 9, wherein to operate of the local interaction device in the first power state consumes less power than to operate the local interaction device in the second power state.

11. The interaction device of claim 9, wherein the local user command is selected from at least one of a voice command, touch command, or a gesture command, wherein the indication of the local user intent to issue a command is determined from at least one of a first gesture of the local user or a first position of the local user, wherein the determination of the first position of the local user includes a detection of a position of a face of the local user relative to a screen of the local interaction device.

12. The interaction device of claim 11, wherein the executable instructions further cause the processor to:
receive the local user command;
identify the received local user command; and
respond to the identified local user command.

13. The interaction device of claim 12, wherein the identified local user command includes a request to connect with the remote user.

14. The interaction device of claim 13, wherein the instructions further cause the processor to establish a persistent connection from the local interaction device to the remote interaction device, including to provide video and audio communications from the local interaction device to the remote interaction device.

15. The interaction device of claim 13, wherein the identified local user command includes a request to initiate a privacy control mode for the local interaction device.

16. The interaction device of claim 9, wherein the processor is included in the local interaction device.

17. A computer-implemented method for establishing a persistent connection between local and remote interaction devices, the method comprising:
providing, by one or more interaction devices, spontaneously a connection from a local interaction device to another remote interaction device for a local user of the local interaction device to interact with a remote user of the remote interaction device, the providing including maintaining a persistent connection between the local and remote interaction devices, wherein the maintaining the persistent connection includes operating the local interaction device in a first power state when a motion of the local user within a local area proximate to the local interaction device is not detected, and operating the local interaction device in a second power state when a motion of the local user within the local area is detected, including: detecting a motion in an area associated with the local user; determining whether the motion is associated with the local user; if the motion is determined to be associated with the local user, switching the local interaction device from the first power state to the second power state; tracking the local user motion in the user area, the tracking including determining a local user intent to issue a command; and if an indication of the local user intent to issue a command is determined, initiating a command reception mode to receive a local user command; and facilitating, by the one or more interaction devices, the interactions between the local and remote users, the facilitating including reducing perception of separation between the local and remote users, wherein the reducing perception of separation includes providing a selected one of a plurality of views of the local area responsive to a gaze direction of the remote user, and providing audio communication from the local interaction device to the remote interaction device with a spatial characteristic that approximates co-location of the local and remote users.

18. The computer-implemented method of claim 17, wherein the operation of the local interaction device in the first power state consumes less power than the operation of the local interaction device in the second power state.

19. The computer-implemented method of claim 17, wherein the spatial characteristic that approximates co-location of the local and remote users provides replication of the audio spatial relationships between the local user and the local interaction device.

20. The computer-implemented method of claim 17, wherein the determining a local user intent to issue a command is based on identifying at least one of a first gesture of the local user or a first position of the local user.

21. The computer-implemented method of claim 20, wherein the identifying the first position of the local user includes detecting, by the one or more interaction devices, a position of a face of the local user relative to a screen of the local interaction device.

22. The computer-implemented method of claim 17, wherein the one or more interaction devices is the local interaction device.

* * * * *